United States Patent
Gregerson et al.

(10) Patent No.: US 8,365,992 B2
(45) Date of Patent: Feb. 5, 2013

(54) OPTICAL SCANNER WITH FLOATING LOAD CELL FRAME

(75) Inventors: David L. Gregerson, Lawrenceville, GA (US); Vaughn W. Keenan, Pendergrass, GA (US)

(73) Assignee: NCR Corporation, Duluth, GA (US)

( * ) Notice: Subject to any disclaimer, the term of this patent is extended or adjusted under 35 U.S.C. 154(b) by 920 days.

(21) Appl. No.: 11/613,491

(22) Filed: Dec. 20, 2006

(65) Prior Publication Data

US 2008/0151328 A1 Jun. 26, 2008

(51) Int. Cl.
*G06K 15/00* (2006.01)
*G06K 7/00* (2006.01)

(52) U.S. Cl. ........................................ 235/383; 235/435

(58) Field of Classification Search ................ 235/383, 235/462.11, 462.43, 435, 462.14; 177/25.15, 177/199, 211, 126; 700/235; 297/1
See application file for complete search history.

(56) References Cited

U.S. PATENT DOCUMENTS

| | | | | |
|---|---|---|---|---|
| 4,656,344 A * | 4/1987 | Mergenthaler et al. | ........ | 235/383 |
| 5,139,100 A * | 8/1992 | Brauneis | ..................... | 177/25.15 |
| 5,646,376 A * | 7/1997 | Kroll et al. | ..................... | 177/211 |
| 5,773,767 A * | 6/1998 | Collins et al. | ................. | 177/126 |
| 5,834,708 A * | 11/1998 | Svetal et al. | ............. | 235/462.43 |
| 6,764,010 B2 * | 7/2004 | Collins et al. | ............. | 235/462.11 |
| RE40,071 E * | 2/2008 | Svetal et al. | ............. | 235/462.43 |
| 7,367,499 B2 * | 5/2008 | Jwo | ........................... | 235/462.14 |
| 7,554,042 B2 * | 6/2009 | Gregerson et al. | ......... | 177/25.15 |
| 7,619,527 B2 * | 11/2009 | Friend et al. | .................. | 235/435 |
| 2003/0071491 A1 * | 4/2003 | Casey et al. | ....................... | 297/1 |
| 2004/0168834 A1 * | 9/2004 | Teraoka et al. | .................. | 177/2 |
| 2004/0168836 A1 * | 9/2004 | Petrucelli | ...................... | 177/199 |
| 2007/0162182 A1 * | 7/2007 | Marti et al. | .................. | 700/236 |

\* cited by examiner

*Primary Examiner* — Thien T Mai

(74) *Attorney, Agent, or Firm* — Paul W. Martin; Peter H. Priest

(57) ABSTRACT

An optical scanner with a floating load cell frame. The optical scanner includes a plurality of planar load cells and a frame for tying the planar load cells together in order to counteract side loads and minimize corresponding spreading of the planar load cells. In one embodiment, the optical scanner includes four planar load cells and the floating frame includes two to four frame members that tie the planar load cells together.

19 Claims, 3 Drawing Sheets

OPTICAL SCANNER WITH FLOATING LOAD CELL FRAME

CROSS-REFERENCE TO RELATED APPLICATION

The present application is related to application Ser. No. 11/613,481, entitled, "METHODS AND APPARATUS FOR MULTIPLE SUPPORT AND WEIGHT MEASUREMENT POINTS IN A SCANNER SCALE COMBINATION", issued as U.S. Pat. No. 7,554,042.

BACKGROUND

Conventional optical barcode scanners typically include a mirrored spinner and pattern mirrors that together optically cooperate to generate a scan pattern. This type of scanner may also include a scale assembly including a load cell, weigh plate, and a support structure, sometimes called an H-bar, for supporting the weigh plate on the load cell. This type of scale assembly is bulky and makes isolating the pattern mirrors from dust and debris difficult. The linearity of a single-point scale system is not as accurate, and is subject to variations as a result of the shifting of the scale components in abusive environments and large impacts during shipping.

It would be desirable to provide an optical scanner including a plurality of load cells with a support structure for supporting a weigh plate.

SUMMARY

An optical scanner with a floating load cell frame is provided. The optical scanner includes a plurality of planar load cells and a frame for tying the planar load cells together.

DETAILED DESCRIPTION

Figure 1:
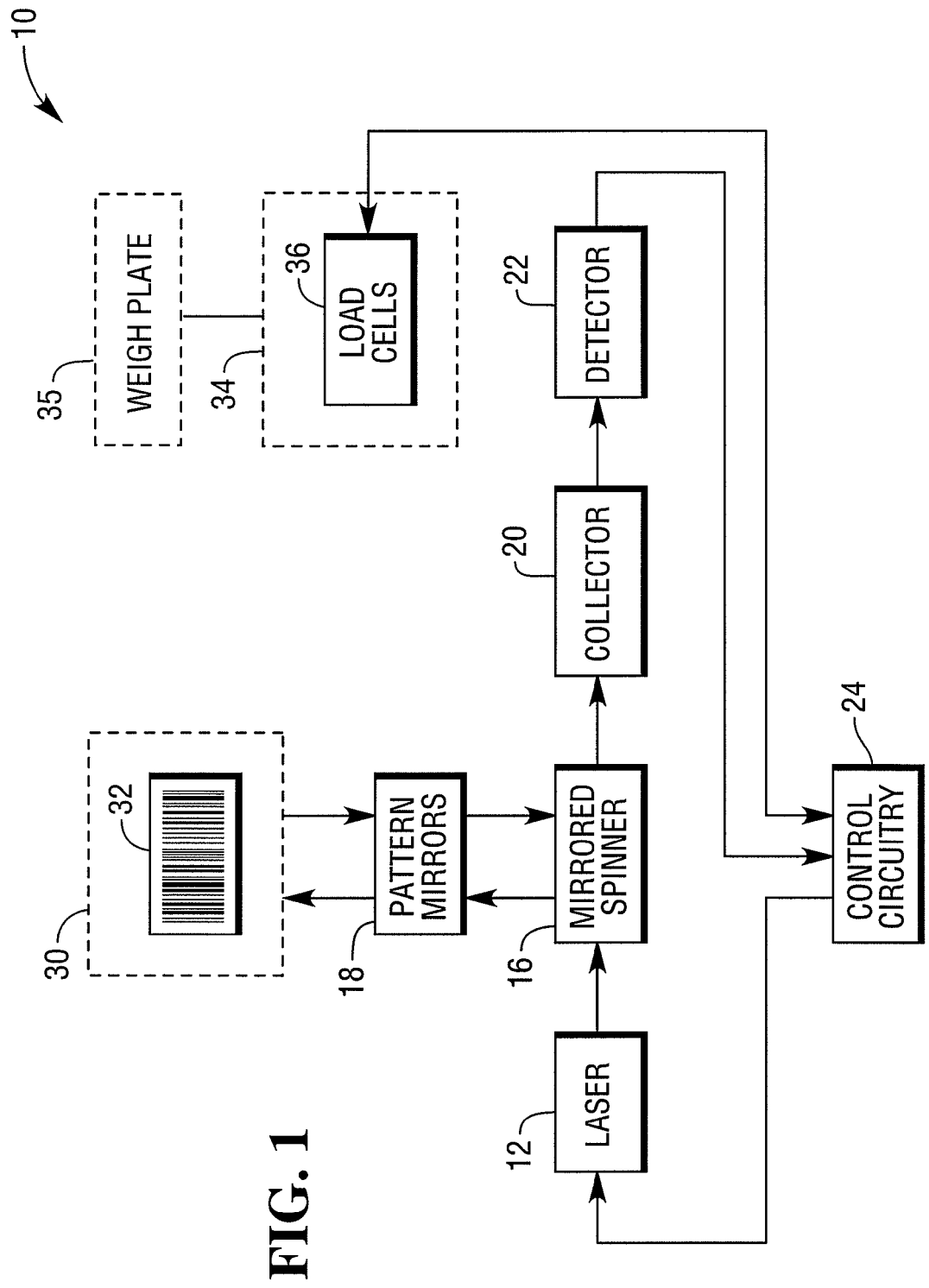
FIG. 1 is a block diagram of an optical scanner.

With reference to FIG. 1, an example embodiment of optical scanner 10 includes laser 12, mirrored spinner 16, pattern mirrors 18, collector 20, detector 22, and control circuitry 24.

Laser 12 produces a laser beam. Scanner 10 may include one or more lasers.

Mirrored spinner 16 directs the laser beam to pattern mirrors 18 to produce a scan pattern, and receives reflected light from item 30 from pattern mirrors 18.

Pattern mirrors 18 direct the laser beam towards bar code label 32 and direct the reflected light to mirrored spinner 16.

Collectors 20 collects the reflected light from mirrored spinner 16 and directs it towards detector 22.

Detector 22 converts the reflected light into electrical signals.

Control circuitry 24 controls operation of scanner 10 and additionally processes the electrical signals to obtain information encoded in bar code label 32.

Scanner 10 additionally includes a load cell assembly 34 including a plurality of load cells 36 that support weigh plate 35.

Figure 2:
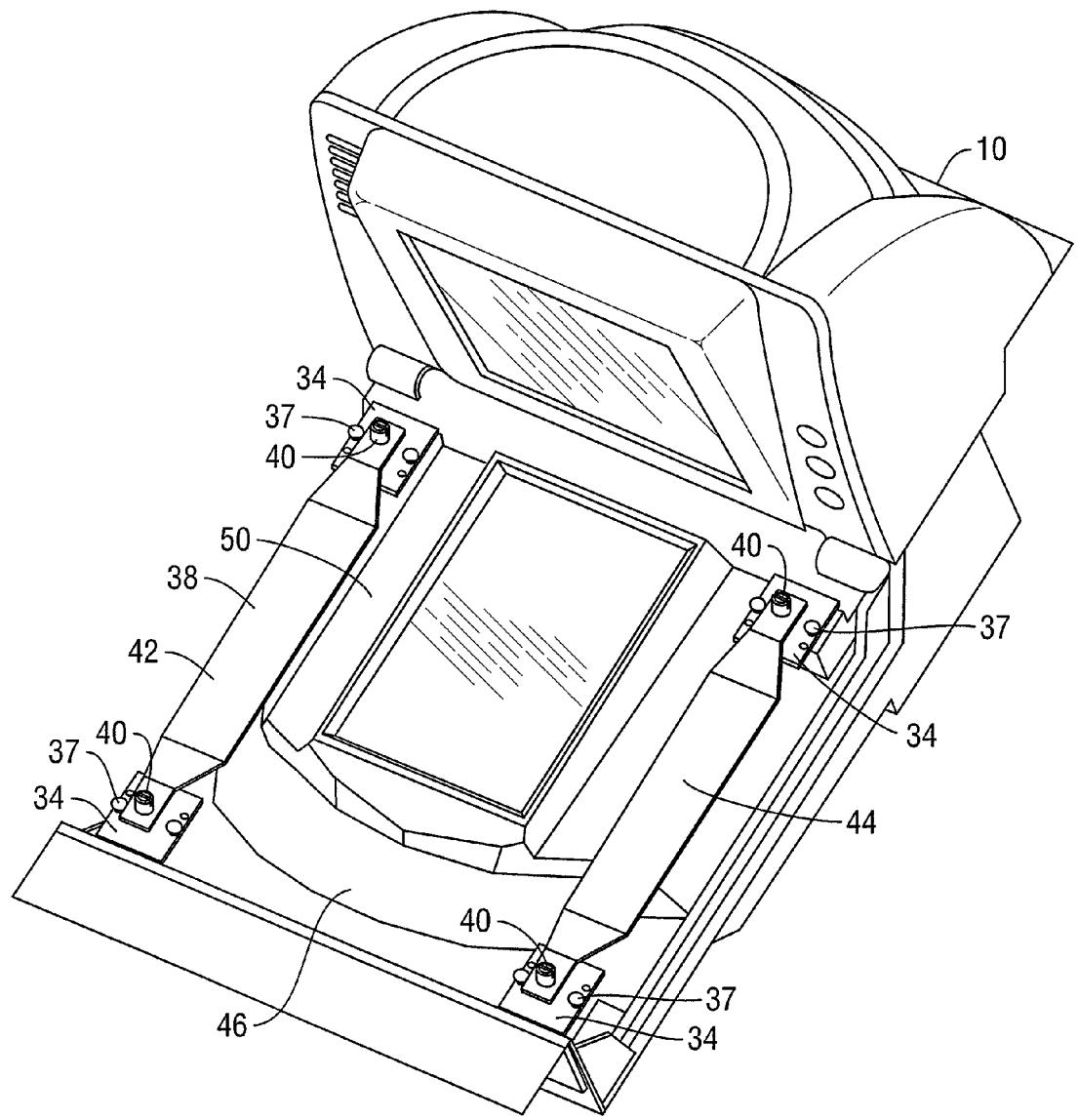
FIG. 2 is a perspective view of the optical scanner with the weigh plate removed.
Figure 3:
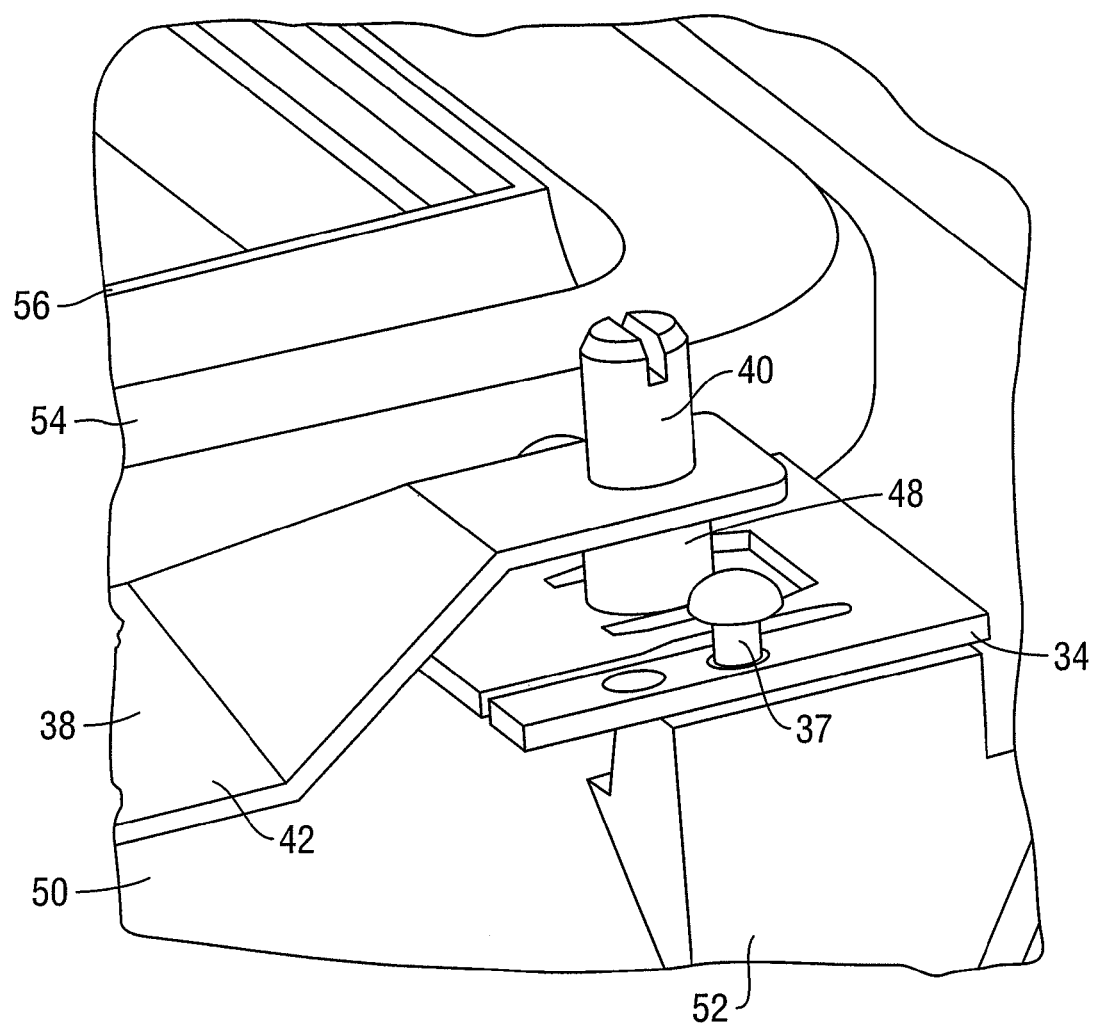
FIG. 3 is a perspective view illustrating attachment of the load cell and weigh plate support structure.

With reference to FIGS. 2-3, an example embodiment of scanner 10 is illustrated in more detail. In this example embodiment, scanner 10 includes a dual-aperture scanner, although, scanner 10 may alternatively be a single-aperture scanner.

In this example, load cell assembly 34 includes four load cells 36. Load cells 36 may include planar load cells, such as those manufactured by Flintec, Inc. Load cells 36 include flexible loadmounts 48. Load cells 36 are fastened to top mounting posts 52 (FIG. 3) of optics housing 50 (containing pattern mirrors 18) using screws 37.

Floating frame 38 counteracts side loads and minimizes corresponding spreading of load cells 36. The illustrated example of frame 38 is made of metal and includes left frame member 42, right frame member 44, and checker-side frame member. Checker-side frame member 46 may be recessed to accommodate installation of an electronic article surveillance (EAS) coil 54 around aperture 56. A fourth side frame member may also be included. Scale pins 40 couple frame 38 to load mounts 48 and support weigh plate 35.

Although particular reference has been made to certain embodiments, variations and modifications are also envisioned within the spirit and scope of the following claims.

What is claimed is:

1. An optical scanner comprising: an optics housing containing optical components including a scanning aperture; four planar load cells mounted outside the optics housing; a weigh plate; and a floating frame physically separate, from the weigh plate and outside the optics housing the floating frame tying the planar load cells together to counteract side loads and reduce spreading of the plurality of load cells, the floating frame connecting the planar load cells; wherein the floating frame is C-shaped comprising a left frame member, a right frame member and a checker-side member connecting the left frame member and the right frame member.

2. The scanner of claim 1, wherein the planar load cells include flexible loadmounts.

3. The scanner of claim 2, further comprising scale pins for fastening the floating frame to the loadmounts.

4. The scanner of claim 3, wherein the scale pins directly support the weigh plate.

5. The scanner of claim 1, further comprising: top mounting posts outside the housing, wherein the planar load cells are coupled to the top mounting posts.

6. The scanner of claim 1, comprising four planar load cells located at approximately opposite corners of the scanner.

7. The scanner of claim 6, wherein the floating frame comprises: a first frame portion on a first side of the scanner and coupled to first and second planar load cells; a second frame portion on a second side of the scanner and coupled to third and fourth planar load cells; and a third frame portion tying the first and second frame portions together.

8. The scanner of claim 7, wherein the third frame portion is located adjacent the scanning aperture of the scanner.

9. The scanner of claim 8, wherein the third frame portion is recessed below the first and second frame members to accommodate placement of an electronic article surveillance coil outside the optics housing and around the scanning aperture.

10. An optical scanner comprising: an optics housing including a scanning aperture and top mounting posts arranged around the scanning aperture outside of the optics housing; four load cells outside the optics housing including loadmounts coupled to the top mounting posts;

a weigh plate; a floating frame separate from the weigh plate, the floating frame tying the planar load cells together to counteract side loads and reduce spreading of the plurality of planar load cells; and scale pins for coupling the floating frame to the loadmounts and for supporting a weigh plate above the optics housing, the scale pins and the loadmounts providing coupling contacts between the optical scanner and the floating frame; wherein the floating frame is C-shaped comprising a left frame member, a right frame member and a checker-side member connecting the left frame member and the right frame member.

11. The scanner of claim 10 wherein the loadmounts are flexible and the scanner further comprises mounting pads and screws as part of the coupling contacts.

12. The scanner of claim 11 further comprising:
pattern mirrors contained within the optics housing.

13. The scanner of claim 11 wherein the floating frame is made of metal.

14. The scanner of claim 11 wherein the floating frame comprises a left frame member, a right frame member and a checker-side member connecting the left frame member and the right frame member.

15. The scanner of claim 14 wherein the checker-side member is recessed to accommodate installation of an electronic article surveillance (EAS) coil.

16. The scanner of claim 15 further comprising:
an electronic article surveillance (EAS) coil accommodated by the checker-side member.

17. The scanner of claim 16 wherein the EAS coil is arranged around the scanning aperture.

18. The scanner of claim 1 wherein the checker-side member is recessed to accommodate installation of an electronic article surveillance coil (EAS) coil.

19. The scanner of claim 18 further comprising an EAS coil around a horizontal scanning aperture.

* * * * *